United States Patent [19]
Ogawa

[11] Patent Number: 6,128,008
[45] Date of Patent: Oct. 3, 2000

[54] DISPLAY TESTER FOR GAME MACHINE

[75] Inventor: Masaki Ogawa, Tokyo, Japan

[73] Assignee: Universal Sales Co., Ltd., Tokyo, Japan

[21] Appl. No.: 09/121,305

[22] Filed: Jul. 23, 1998

[30] Foreign Application Priority Data

Aug. 6, 1997 [JP] Japan ................................. 9-224357

[51] Int. Cl.[7] .................................................. G09G 5/00
[52] U.S. Cl. ........................ 345/204; 702/117; 702/119; 702/120; 345/904
[58] Field of Search ................................ 345/204, 904; 702/117, 119, 120, 123, 108

[56] References Cited

U.S. PATENT DOCUMENTS

| | | | |
|---|---|---|---|
| 5,153,886 | 10/1992 | Tuttle ....................................... | 702/120 |
| 5,335,342 | 8/1994 | Pope et al. ............................... | 395/575 |
| 5,432,705 | 7/1995 | Severt et al. ............................. | 364/481 |
| 5,475,695 | 12/1995 | Caywood et al. ........................ | 702/119 |
| 5,684,726 | 11/1997 | Osborn et al. ........................... | 702/119 |
| 5,757,680 | 5/1998 | Boston et al. ............................ | 702/119 |
| 5,805,471 | 9/1998 | Yakubov et al. ......................... | 364/579 |
| 5,808,920 | 9/1998 | Zwan et al. .............................. | 364/579 |
| 5,995,915 | 11/1999 | Reed et al. ............................... | 702/119 |
| 6,002,868 | 12/1999 | Jenkins et al. ........................... | 702/119 |
| 6,038,520 | 3/2000 | Schoonover et al. .................... | 702/117 |

FOREIGN PATENT DOCUMENTS 9-122309   5/1997   Japan .

OTHER PUBLICATIONS

"Automated Testing of Application Programs" IBM Technical Disclosure Bulletin, vol. 28, No. 9, Feb. 1, 1986, p. 3726/3727 XP000715296 ISSN: 0018–8689 *the whole document*.

*Primary Examiner*—Richard A. Hjerpe
*Assistant Examiner*—Kimnhung Nguyen
*Attorney, Agent, or Firm*—Pillsbury Madison & Sutro LLP

[57] ABSTRACT

A game machine display testing apparatus reduces man-hours required to test a newly developed or altered game machine display to a great extent. A library (14) generates commands as transmission data to be transmitted to a game machine display 200. The transmission data is displayed on a table provided on a transmission data display unit 38 so that required data can be selected. The selected data is transmitted to the game machine display 200. An image formation CPU emulation unit 16 executes an image formation program that is held in an image formation program holder 17. The image formation program extracts required data from the image data that is held in an image data holding unit 18 and uses the extracted image data so as to compose images that correspond to the generated transmission data. The image formation program then displays the composed images onto a screen 12 of the game machine display testing apparatus that is emulating the game machine display, and extracts image data from the screen 12.

Although the present invention has been explained in reference to the embodiment, it is apparent for those skilled in the art that many changes and modifications can be made without departing from the spirit and scope of the invention, as clear from the following claims.

10 Claims, 8 Drawing Sheets

COMMUNICATION CODE TABLE

| Event number and information content | | bit information | content |
|---|---|---|---|
| event number: 0 (left picture information) | advance data subsequent data | 1000 XXXX 0000 00XX | 0 - 14 : picture number 0 - 2 : offset |
| event number: 1 (middle picture information) | advance data subsequent data | 1001 XXXX 0XXX XXXX | 0 - 14 : picture number 0 - 116 : offset * there are two types of offsets, 0 - 2 and 0 - 116, option 2 of event number 5 identifies offset type |
| event number: 2 (right picture information) | advance data subsequent data | 1010 XXXX 0000 00XX | 0 - 14: picture number 0 - 2: offset |
| event number: 4 (big hit) | advance data subsequent data | 1100 XXXX 0000 XXXX | 0 - 15: round number 0 - 10: count number |
| event number: 3 (forecast picture information 1) | advance data subsequent data | 1011 XXXX 0XXX XXXX | dragonfly forecast data 2: use bit 0 - 3 when carrying the digit of the value larger than 128 dragonfly forecast data 1: 0 - 127 |
| event number: 6 (forecast picture information 2) | advance data subsequent data | 1110 000X 0000 0XXX | big hit data 0 - 16:reach number |
| event number: 5 (condition 1) | advance data subsequent data | 1101 XXXX 0XXX XXXX | option 1 option 2: numbers from Fig. 5 are supplied to the X |
| error | advance data | 1111 1111 | only the error code is a 1-type code |

CONTENT OF OPTION 2 OF EVENT NUMBER 5 (STATE 1)

| number: content |
| --- |
| 00H: not used yet |
| 01H: display title demonstration |
| 02H: display picture   *the picture is at rest |
| 03H: stop left picture |
| 04H: stop right picture |
| 05H: not used yet |
| 06H: raise right leg |
| 07H: raise left leg |
| 08H: land right leg |
| 09H: land left leg |
| 0AH: start hand clapping |
| 0BH: stop hand clapping |
| 0CH: start slapping |
| 0DH: stop slapping |
| 0EH: start ax chop |
| 0FH: stop ax chop |
| 10H: start full rotarion |
| 11H: full rotation tsunami |
| 12H: stop full rotation |
| 13H: watch and miss cascade climbing |
| 14H: cascade climbing faint 1 |
| 15H: cascade climbing faint 2 |
| 16H: climb cascade carp hit |
| 17H: climb cascade carp release |
| 18H: stop climbing cascade |
| 19H: sumo 1 start tornado |
| 1AH: sumo 1 stop tornado |
| 1BH: sumo 2 start earth |
| 1CH: sumo 2 stop earth |
| 1DH: sumo 3 start head bat |
| 1EH: sumo 3 stop head bat |
| 1FH: sumo 4 start pile loss |
| 20H: sumo 4 stop pile loss |
| 21H: sumo 5 start pile win |
| 22H: sumo 5 stop pile win |
| 23H: "miss" action 1 |
| 24H: "miss" face |
| 25H: generate kiai (focused yell) |
| 26H: display big hit |
| 27H: win V prize |
| 28H: in the middle of the big hit |
| 29H: display big hit picture |
| 2AH: end big hit (ending) |
| 2BH: all pictures fluctuate |
| 2CH: bear forecast |
| 2DH: forecast "raise right leg" |
| 2EH: forecast "raise left leg" |

FIG. 6A

COMMAND FOR RAISING RITHT LEG

| code | bit | content of the X and the like |
|---|---|---|
| DX | 1101 0X00 | *option 1: bit 2 represents the state of a probability mode<br>0 = normal probability mode<br>1 = high probability mode |
| 06 | 0000 1010 | raise right leg |
| AX | 1010 XXXX | picture number of right picture 0 - 14 |
| 0X | 0000 00XX | offset of right picture (position) 0 - 2 |
| 9X | 1001 XXXX | picture number of middle picture 0 - 14 |
| 0X | 0000 00XX | offset of middle picture (positon) 0 - 2 |
| 8X | 1000 XXXX | picture number of left picture 0 - 14 |
| 0X | 0000 00XX | offset of left picture (position) 0 - 2 |

FIG. 6B

COMMAND FOR LANDING RITHT LEG

| code | bit | content of the X and the like |
|---|---|---|
| DX | 1101 0X00 | *option 1: bit 2 represents the state of a probability mode<br>0 = normal probability mode<br>1 = high probability mode |
| 08 | 0000 1000 | land right leg. + oscillate right picture |
| AX | 1010 XXXX | picture number of right picture 0 - 14 |
| 0X | 0000 00XX | offset of right picture (position) 0 - 2 |
| 9X | 1001 XXXX | picture number of middle picture 0 - 14 |
| 0X | 0000 00XX | offset of middle picture (positon) 0 - 2 |
| 8X | 1000 XXXX | picture number of left picture 0 - 14 |
| 0X | 0000 00XX | offset of left picture (position) 0 - 2 |

FIG. 7A
COMMAND FOR STARTING HAND CLAPPING

| code | bit | content of the X and the like |
|---|---|---|
| DX | 1101 0X00 | *option 1: bit 2 represents the state of a probability mode<br>0 = normal probability mode<br>1 = high probability mode |
| 0A | 0000 1010 | hand clapping: kintarou opens his arms for hand clapping |
| AX | 1010 XXXX | picture number of right picture 0 - 14 |
| 0X | 0000 00XX | offset of right picture (position) 0 - 2 |
| 9X | 1001 XXXX | picture number of middle picture 0 - 14 |
| 0X | 0000 00XX | offset of middle picture (positon) 0 - 2 |
| 8X | 1000 XXXX | picture number of left picture 0 - 14 |
| 0X | 0000 00XX | offset of left picture (position) 0 - 2 |

FIG. 7B
COMMAND FOR STOPPING HAND CLAPPING

| code | bit | content of the X and the like |
|---|---|---|
| DX | 1101 0X00 | *option 1: bit 2 represents the state of a probability mode<br>0 = normal probability mode<br>1 = high probability mode |
| 0A | 0000 1011 | hand clapping: kintarou claps his hands. + stop middle picture |
| AX | 1010 XXXX | picture number of right picture 0 - 14 |
| 0X | 0000 00XX | offset of right picture (position) 0 - 2 |
| 9X | 1001 XXXX | picture number of middle picture 0 - 14 |
| 0X | 0000 00XX | offset of middle picture (positon) 0 - 2 |
| 8X | 1000 XXXX | picture number of left picture 0 - 14 |
| 0X | 0000 00XX | offset of left picture (position) 0 - 2 |

FIG. 8

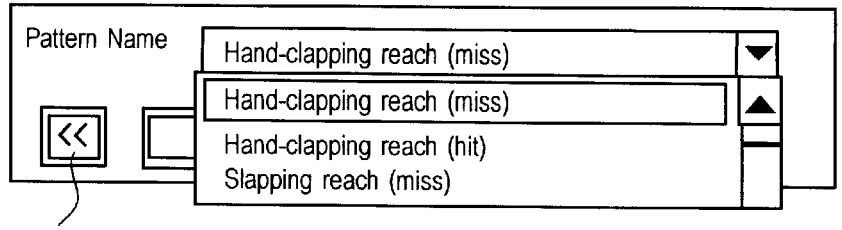

DISPLAY TESTER FOR GAME MACHINE

This patent application claims priority based on the Japanese patent application, H09-224357, filed on Aug. 6, 1997, the contents of which are incorporated herein by reference.

BACKGROUND OF THE INVENTION

1. Field of the Invention

The present invention relates to a game machine display testing apparatus. In particular, the present invention relates to a game machine display testing apparatus for testing the performance of a liquid crystal display apparatus of a pin-ball machine, composing on the display screen a hard copy of an application form to be submitted to a qualification agency (public safety commission), developing or debugging a program, and the like.

2. Description of Related Art

In a pin-ball machine such as a pachinko machine, a display (display apparatus) that is constituted of liquid crystal and the like is installed near the center of the game board. On this display, various characters (such as persons, animals, and the like), the motion of reels, and the like are displayed, showing the state of the game such as hits or misses or the like. These displayed states of the game are combined with effect sounds so as to create a specific atmosphere for the game.

Novelties are always sought after for game machines. Each game machine manufacturer is always trying to develop a game having a new content and updated game choreography. Hence, every time a new type of machine is developed, new pictures, new characters, new combinations, new moves, and the like are developed for a game machine display, for example, a liquid crystal display. At the same time, the corresponding hardware and software are improved or corresponding new hardware and software are developed.

The size of a program that a game machine display controlling CPU executes is restricted to, for example, 4 K bytes by regulations on manufacturing game machines. In manufacturing a conventional game machine, a program area of the conventional game machine has no extra room for accommodating a new program. Therefore, in order to install a new program in the conventional machine, some type of specification change is needed such as discarding the old programs, changing the data structure, or changing the overall specification.

The CPU of the game machine display follows orders supplied from the main control apparatus (main CPU) which controls the main body of the game machine, and forms various types of images such as a frame sequence of a moving picture, screen effects such as fade-in, fade-out, and the like. Therefore, when the specification of the game machine display is changed, the protocol of the game machine display does not match the protocol of the main control apparatus of the main body of the game machine. Thus, when a new liquid crystal display is completed after the specification change, the new liquid crystal display cannot be tested by itself. Conventionally, a main control apparatus based on a new specification also had to be completed in order to test the motions of the characters or the motions of the reels to be displayed on the liquid crystal display, or to conduct other performance tests.

Even if the main control apparatus is completed, the performance of the actual game machine itself is difficult to test. The state of the game installed in the game machine evolves in an unpredictable and random manner. Therefore, the content of the game machine display also changes randomly. For example, even if the characters that appear in the game and the motions of the characters are the same, the pictures of the reels during the game and the final pictures of the reels that are displayed at the end of the game are not predetermined. Thus, standard performance tests for the liquid crystal display of the actual game machine, such as temporarily stopping the display or checking the degree of precision of the motions of the characters or the like by repeating the same motions many times, were difficult to conduct on the actual machines.

In addition, whenever a manufacturer develops a new game machine or changes the specification of a conventional game machine, the manufacturer needs to submit an application form to the qualification agency to have the new game machine or new specification approved. In this case, the manufacturer is required to disclose in detail the content of the display in accordance with the flow of the game. For example, the motions of the characters or reels, and the manners in which hits or misses that result from the motions of the characters or reels are expressed need to be disclosed.

In order to meet this requirement, it is desirable that hard copies of arbitrary scenes that appear on the display screen be obtained. However, it has been difficult to generate on the screen of the actual game machine the above-explained detailed content of the game, which is a combination of various motions of the characters, reels, and the like, in correspondence with the flow of the game. In order to overcome this problem, software or hardware for achieving this objective or a software for using a general purpose in-circuit emulator was conventionally installed on the main control apparatus of the game machine or the liquid crystal display control substrate. In addition, in order to obtain a hard copy of an arbitrary scene shown on the display screen, the image signal of the scene was picked up from the control circuit. The picked-up image signal was then computer-processed, and a corresponding image data was obtained.

It is extremely difficult to confirm the game content of the game machine in accordance with the application document to be submitted to the qualification agency. In addition, it is very hard to read out these random motions from the application document. As a result, it takes an enormous amount of time to understand these random motions. Furthermore, there is no way to predict when these random motions will appear on the display. Therefore, even when the motions of the characters or reels, and the manners in which hits or misses that result from the motions of the characters or reels are expressed needed to be confirmed, they sometimes did not appear immediately.

Thus, a large number of man-hours were needed in order to develop a new main body of the game machine, or a display in accordance with a new specification, and to have the new main body of the game machine or new display specification approved.

SUMMARY OF THE INVENTION

Given these circumstances, it is an object of the present invention to reduce man-hours required to test a newly developed or altered game machine display.

To achieve this objective, according to the present invention, using a library for generating commands to be supplied to the game machine display, transmission data to be transmitted to the game machine display is generated. In addition, the transmission data is displayed on a table so that any desired data can be selected and transmitted to the game machine display. Moreover, an image formation program is executed using an image composition emulating means. Then an image that corresponds to the transmission data that has been obtained by selecting and extracting desired data from the image data is composed. Subsequently, the composed image is displayed on the screen of a game display testing apparatus that is emulating the game machine display or the image data is picked up from the game display testing apparatus.

According to the present invention, pictures which the three reels display at their stop timing are designated, and a required pattern is displayed. In this way, the performance of the hardware and software of the game machine display can be evaluated. Moreover, various kinds of tests of a liquid crystal display, which conventionally required complicated procedures, such as debugging of the software of the game machine display, debugging of individual programs, and production of a hard copy that appears on the display screen at an arbitrary timing, can be conducted, for example, on a PC.

It is difficult to precisely describe in writing random motions of the characters or the like that appear in the game. However, according to the present invention, any complicated random motions of the characters or the like that appear in the game can be easily presented in exactly the same way they appear on the actual game machine, simply by selecting and activating programs and image data that correspond to the motions. In particular, conventionally, it has not been easy to produce desired patterns on the actual game machine display. However, according to the present invention, the desired patterns can be easily produced on the screen as many times as necessary.

BRIEF DESCRIPTION OF THE DRAWINGS

FIG. 4 shows the types of the events shown in FIG. 3.

FIG. 5 shows the content of the option 2 of the event number 5 shown in FIG. 4.

FIG. 6A shows a first example of a command consisting of an 8-byte data having four events.

FIG. 6B shows a second example of a command consisting of an 8-byte data having four events.

FIG. 7A shows a third example of a command consisting of an 8-byte data having four events.

FIG. 7B shows a fourth example of a command consisting of an 8-byte data having four events.

FIG. 8 is a front view of a window showing pattern names on a table.

DETAILED DESCRIPTION OF THE INVENTION

The preferred embodiment of the present invention will be explained in reference to the attached drawings.

Figure 1:
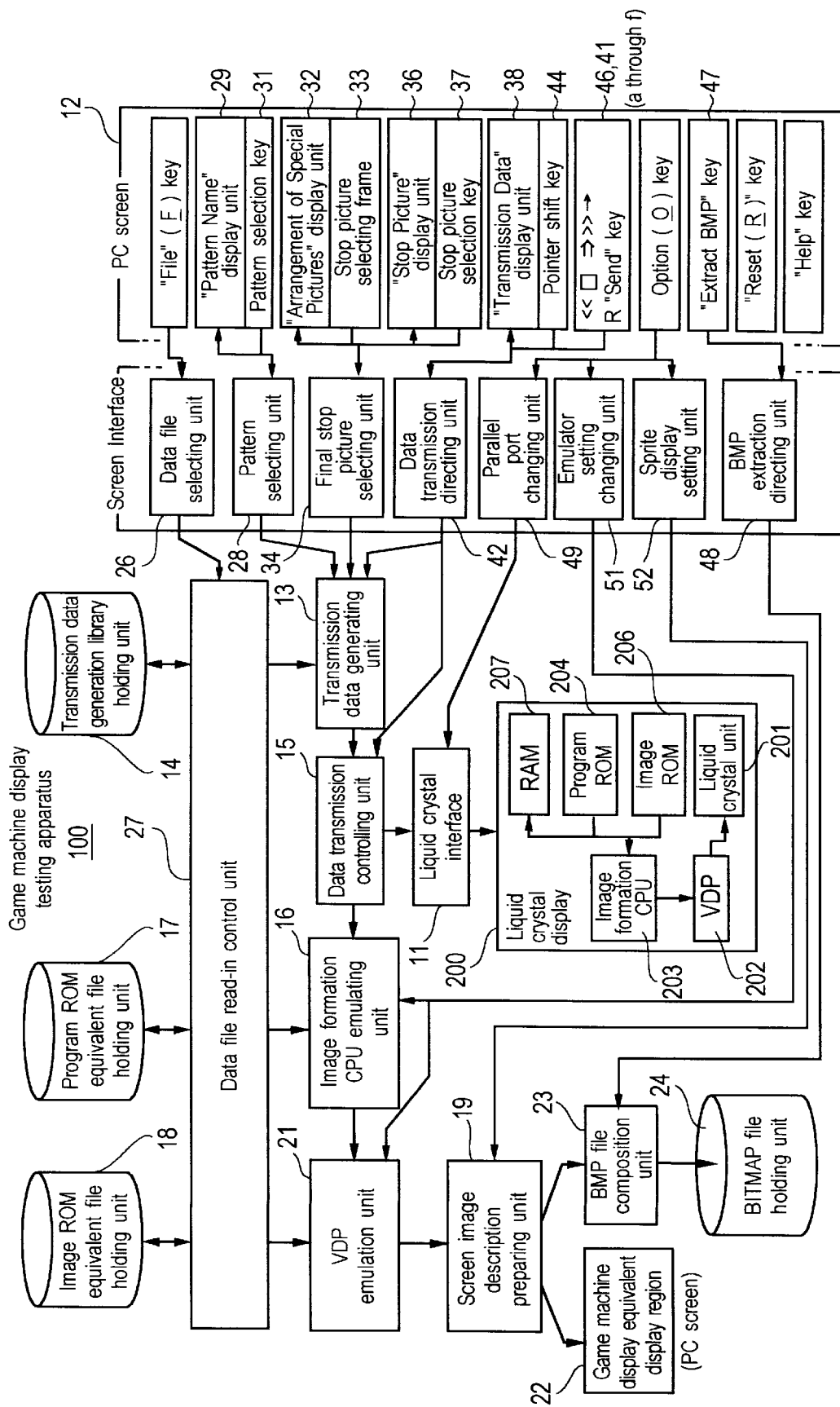
FIG. 1 is a block diagram showing the configuration of a game machine display testing apparatus 100 according to an embodiment of the present invention.
Figure 2:
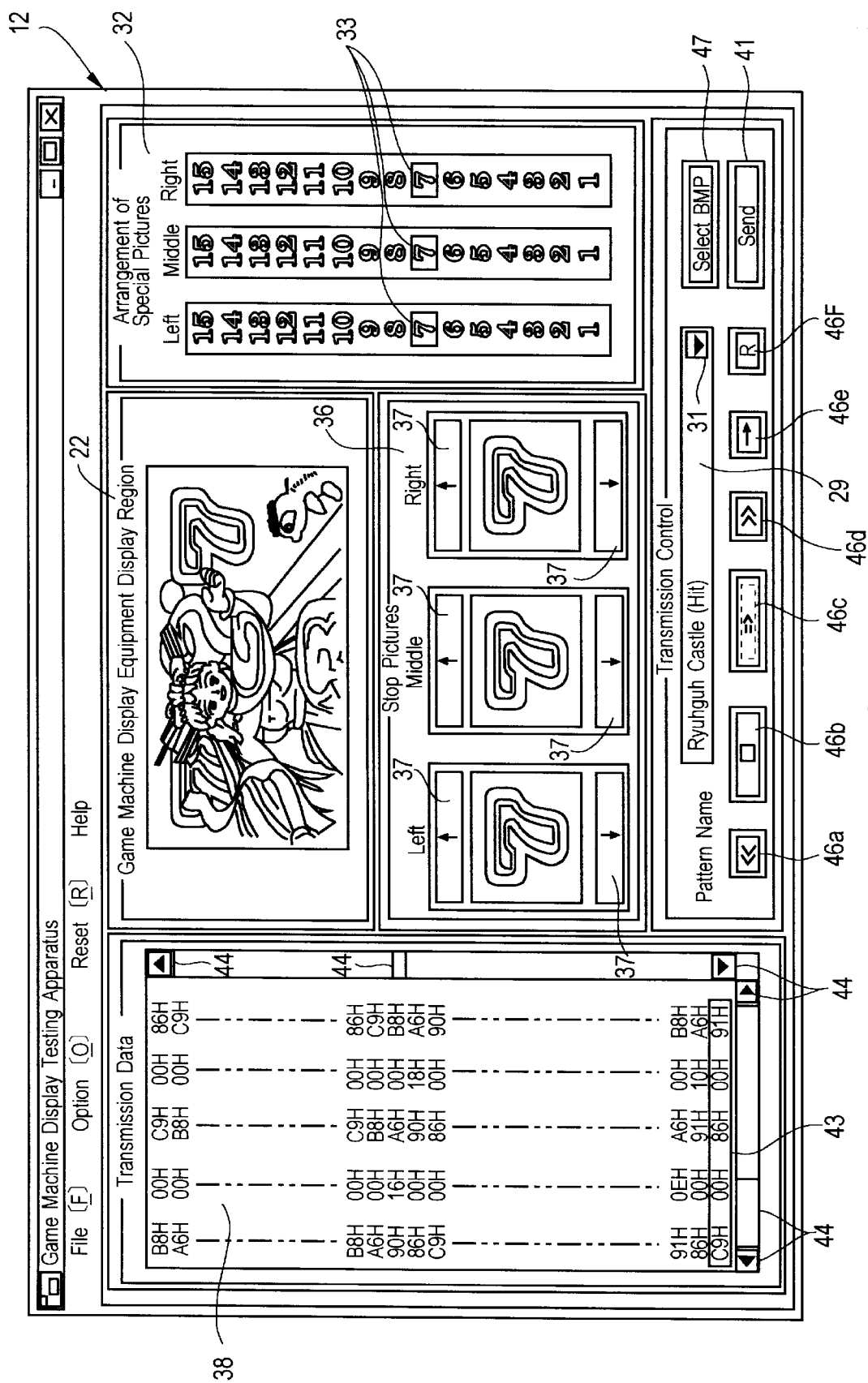
FIG. 2 is a front view of a screen 12 (screen of a personal computer) of a game machine display apparatus according to the embodiment of the present invention.

In what follows, a game machine testing apparatus 100 according to an embodiment of the present invention will be explained. FIG. 1 shows the block configuration of the game machine testing apparatus 100. Here, the game machine testing apparatus 100 is installed on a PC (personal computer). Each of the blocks shown in FIG. 1 is realized by resources the PC has (excluding the liquid crystal interface 11 to be explained later). Various displays such as those shown in FIG. 2 are tested on the PC screen 12.

The liquid crystal display 200 is an object to be tested, and is not a component of the game display testing apparatus 100. The liquid crystal display 200 is installed in the game machine so as to display motion pictures and still pictures that correspond to the state of the game.

The liquid crystal display 200 is constituted of a liquid unit 201, a VDP202 for controlling the display of the liquid unit 201, an image formation CPU 203 for supplying image data to the VDP202, a program ROM 204 for storing the motion program of the image formation CPU 203, an image ROM 206 for storing image formation data, and a RAM 207 to be used for a work area as a temporarily storage or the like.

Here, an EAMD161A (product name) made by Fujitsu company is used for the liquid crystal unit 201. An EAMD135A001 (product name) made by Fujitsu company is used for the VDP202. Z80 (product name) made by Zilog company is used for the image formation CPU 203. The liquid crystal display 200 is connected to a game machine main control apparatus not shown in the drawing. Therefore, the interface of the liquid crystal display 200 is installed so as to face the game machine main control apparatus. A liquid crystal interface 11 connects the game machine display 200 to the PC. One side of the liquid crystal interface 11 matches the game machine display 200, and the other side of the liquid crystal interface 11 matches the PC. Thus, this liquid crystal interface 11 is constituted of desired software and hardware, in addition to the resources the PC has.

The image formation CPU 203 extracts necessary image data from the image ROM 206 in response to a command that is supplied from the game machine main control apparatus, and forms images. Then the image formation CPU 203 supplies the images to the VDP 202 at a rate of, for example, one per approximately 32 milliseconds. In this way, various patterns (scenes) created by the scenario producers of the game machine are displayed on the liquid crystal unit 201 in accordance with the transition of the game. Here, a number of fundamental patterns, for example 150 or 200 fundamental patterns, are prepared in advance by the personnel in charge of choreography of the game machine display. Each of the fundamental patterns constitutes a unit scene with a story. For example, when each of the reels starts to rotate, a fundamental pattern appears, in which a bear throws Kintarou (a strong boy, of a well known Japanese fairy tale in which he regularly practices sumo wrestling with a bear) and the bear jumps around with joy. While the bear is jumping around with joy, each of the reels stops rotating, and a hit, in which case the player wins a prize, or miss, in which case the player does not win a prize, is determined. The picture of each of the reels and other scenes are combined with these fundamental patterns. Thus, the total number of these combinations becomes enormous.

In the actual game machine, these patterns (scenes) appear at random. Hence, in the present testing machine 100, the patterns and the final stop picture (the picture that appears when the respective reel stops) of each of the reels can be programmed to appear in a prescribed order, in order to test the performance of the liquid crystal display 200 easily. The transmission data generating unit 13 (transmission data generation means) of the testing apparatus 100 generates a series of transmission data having the same form as a series of commands that are supplied from the game machine control apparatus. Then the series of transmission data is supplied to the liquid crystal display 200, that is, the test object. As a result, the patterns and the pictures of the reels will move in accordance with the prescribed order. In this way, the performance of the liquid crystal display 200 can be tested precisely and quickly.

As a transmission data generation library, a series of data sequences for producing each of these fundamental patterns onto the screen is prepared for each type of game machine. Multiple series of such data sequences are stored in a transmission data generation library holder 14 (library holding means). In order to produce actual transmission data, the values that designate the state of picture of each of the reels at each timing are encoded into the series of data sequences that generate these fundamental patterns according to a prescribed order. No reference codes are attached to the transmission data generation libraries themselves. Instead, the library holding means is given a reference code 14, In order to distinguish the library holder from the libraries. Similarly, no reference codes are given to the image ROM equivalent files, the program ROM equivalent files, the BITMAP files, and the like. The holders of these files are given reference codes.

Figure 3:
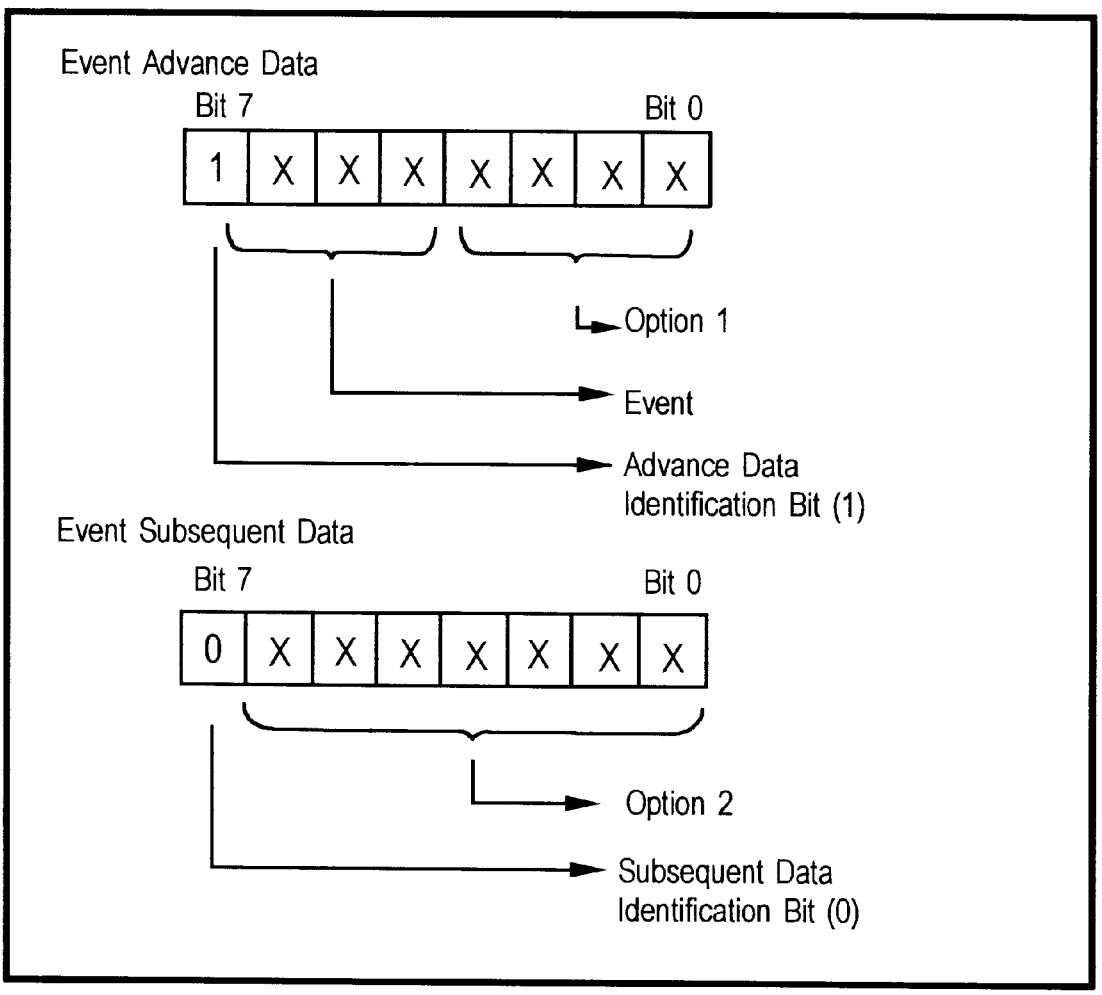
FIG. 3 is a data structure diagram showing events, which constitute fundamental elements of data (commands) that is transmitted from a game machine main control apparatus to a liquid crystal display 200.

Each of the game machine manufacturers independently determines the structures of the commands to be transmitted to the liquid crystal display 200. FIGS. 3 through 7 show examples of command structures to be transmitted to the liquid crystal display 200. Each command consists of a sequence of events. As shown in FIG. 3, each of the events is constituted of a first byte containing an advance data and a second byte containing a subsequent data, forming two bytes. The advance data is designated by "1" in the bit 7 of the first byte. The subsequent data is designated by "0" in the bit 7 of the second byte. "0" or "1" is supplied to each of the "X".

FIG. 4 shows eight types of prepared events. These events are designated by event numbers 0 through 6, and a label "error". It is to be noted that only the event indicated by "error" is constituted of one byte. The other events are constituted of two bytes. One of the codes (hexa codes) shown in FIG. 5 is supplied to the option 2 of the event 5. The "H" at the end of each of these codes indicates that the code is a hexa code. Four of these events are bundled to form an 8-byte data, which constitutes one command (this is called a command packet). FIGS. 6 and 7 show an example of such a command packet. Specifically, the hexa codes "DX", "06", "AX", "0X", "9X", "0X", "8X", and "0X" are listed in this order from the top on the first column of the table shown in FIG. 6A. These hexa codes constitute a command packet (required hexa codes to be explained later are supplied to the "X").

Each of the commands shown in FIGS. 6 and 7 is constituted of four events. The first event designates the motion of the characters or the like, which corresponds to the event number 5 (state 1) shown in FIG. 4. The second through fourth events designate the pictures of the left, middle, and right reels, respectively. The second through fourth events correspond to the event numbers 0 through 2 shown in FIG. 4. These commands are transmitted from the game machine control apparatus to the liquid crystal display 200, for example, every approximately 32 milliseconds. During approximately 32 milliseconds, approximately 30 frames (images) per second are displayed on the liquid crystal display 200.

The image formation CPU 203 (image composition means) of the liquid crystal display 200 receives these commands. In accordance with the received commands, the image formation CPU 203 forms images for the frames, an image for each of the frames. When these images are formed, for example, the characters (persons, animals, and the like) on the screen move in a prescribed manner, or each of the left, middle, and right reels moves, or a big hit state of the game is displayed. In the commands shown in FIGS. 6 and 7, an image that constitutes a portion of a fundamental pattern (scene or scenery) is formed. In the image, Kintarou appearing on the liquid crystal screen stomps shiko (a stomping squatting exercise every sumo wrestler practices to strengthen his lower body), and simultaneously, each of the three reels rotates.

The program ROM 204 inside the liquid crystal display 200 stores a program for executing the received commands. Here, the afore-mentioned Z80 is used as the image formation CPU 203. Thus, this program is also encoded in the machine language of Z80. The size of this program is restricted to, for example, 4 k bytes.

The dot data (image data) of the characters, pictures, and the like, which constitute these images, is stored in the image ROM 206. The bit map data of the special pictures (the numbers 1 through 15) shown in the three columns displayed under the label "arrangement of special pictures" shown in FIG. 2 is also stored in the image ROM 206. Each of these special pictures is constituted of 64×64 dots. The image data that is formed based on the dot data is sequentially supplied to the VDP 202. The VDP 202 directly controls the operation of the liquid crystal unit 201. For example, the VDP 202 turns on or off each of the dots that constitute the liquid crystal unit 201.

An image formation CPU emulation unit 16 (image composition emulation means) emulates the function of the image formation CPU 203 of the liquid crystal display 200. Here, this image formation CPU emulation unit 16 emulates the function of the Z80. A program ROM equivalent file held in a program ROM equivalent file holder 17 (program holding means) stores the same machine language as the machine language stored in the program ROM 204 of the liquid crystal display 200. An image ROM equivalent file held in an image ROM equivalent file holder 18 (image data holding means) stores the same image data as the image data stored in the image ROM 206 of the liquid crystal display 200.

The program ROM equivalent file stores multiple Z80 machine language programs so as to cope with multiple types of game machines. In order to test the liquid crystal display 200 of a game machine of a certain type, a program that matches the type of the game machine is loaded onto the memory (not shown in the drawing) of the PC. The image formation CPU emulation unit 16 extracts necessary dot data from the image ROM equivalent file, and executes the loaded program encoded in the Z80 machine language. Thus, the image formation CPU emulation unit 16 executes exactly the same image formation operation, image effect process, and the like, that the liquid crystal display 200 executes.

In the liquid crystal display 200 of the actual game machine, the data generated by the image formation CPU 203 is supplied to the VDP 202. This VDP 202 controls the liquid crystal unit 201, turning on or off the dots of the liquid crystal unit 201. based on the data supplied from the image formation CPU 203. The liquid crystal display 200 used here has eight sprites (layers). In the actual game machine, these sprites are turned on or off (displayed or not displayed) by commands supplied from the game machine main control apparatus.

It is desirable that these sprites can be freely turned on or off during a display test. Hence, according to the present embodiment, a screen picture plotting preparation unit 19, which is lacking in the actual game machine, is installed in the game machine display testing apparatus 100. This screen picture plotting preparation unit 19 selects the data on the sprites to be turned on from all the data supplied from the VDP emulation unit 21, and supplies the data on the selected sprites to the game machine display equivalent display region 22. The selected sprites are displayed in the game machine display equivalent display region 22. The screen picture plotting preparation unit 19 and the VDP emulation unit 21 constitute a display control means which emulates the game machine display, and displays the composed images on the screen of the game machine testing apparatus. As shown in FIG. 2, the game machine display equivalent display region 22 is installed on the PC screen 12 so as to correspond to the screen (liquid crystal unit 201) of the liquid crystal display 200, which is to be tested. The image displayed on the game machine display equivalent display region 22 is compared with the image displayed on the liquid crystal display 200. In this way, the performance of the liquid crystal display 200 is judged.

A BMP file composition unit 23 (image data extraction means) extracts, in the form of a file, the bit map data of the image being displayed on the game machine display equivalent display region 22. The BMP file composition unit 23 executes this operation in response to instructions provided by a user (test conductor). The extracted data is stored in a BITMAP file holder 24 (BITMAP=bit map). This bit map data can be printed out as a hard copy to be pasted onto, for example, a required position of the application form to be submitted to the qualification agency. This bit map data can also be displayed on the PC screen 12.

As shown in FIG. 2, the user interface of this game machine display testing apparatus is constituted of multiple keys and multiple display regions shown on the PC screen 12, multiple screen interfaces that correspond to the keys and the display regions, a cursor not shown in FIG. 2, a mouse, a keyboard, and the like. The game machine display equivalent display region 22 is also displayed on the PC screen 12. However, in the block diagram of FIG. 1, the game machine display equivalent display region 22 is shown separated far from the PC screen 12 so that the block diagram will not be cluttered. Each of the keys and each of the display regions on the PC screen 12 are represented by blocks that are arranged vertically below the label "PC screen" on the right side of FIG. 1. The screen interfaces that correspond to these keys and display regions are represented by blocks that are arranged vertically below the label "screen interface" in FIG. 1.

In what follows, the function of each of the keys and the content of each of the display regions will be explained, together with the operation method of this testing apparatus 100. First, in FIG. 2, when the "File (F)" key on the upper left corner of the PC screen 12 is clicked, a data file selector 26 is activated and opens a window not shown in FIG. 2 immediately below the "File (F)" key.

This window displays a list of machine specific testable ROM data and transmission data. ROM data and transmission data to be tested are selected from the list. ("File (F)" key is equivalent to the label "File (F)" shown on the PC screen 12. The same holds for the other keys. No reference codes are given to these keys. In addition, what is meant by "click" is to place the cursor to a desired position on the PC screen 12, and click the left button of the mouse at the desired position. In order to avoid a length explanation, this type of terse expressions are adopted. The same type of terse expressions will be used in the other parts of the present document.)

When testable ROM data and transmission data are selected, a data file read-in control unit 27 reads an image ROM equivalent file, a program ROM equivalent file, and a transmission data generation library, which correspond to the type of the selected liquid crystal display 200, into a main memory, not shown in the drawing, of the PC. The transmission data generation library contains bundles of fundamental patterns such that each of the bundles of fundamental patterns corresponds to each type of game machine. When the transmission data generation library that matches the type of the liquid crystal display 200 being tested is read in by the above-explained operation, a pattern selector 28 reads out the name of the first of the many patterns contained in the transmission data generation library, and displays the name on a "pattern name" display unit 29 on the PC screen 12 (in FIG. 2, the first pattern name is displayed as "Ryuhguh castle reach (hit)").

In order to test the liquid crystal display 200 using a different pattern, a pattern selection key 31 is clicked, which is located to the right of the "pattern name" display unit 29 on the PC screen 12. When the pattern selection key 31 is clicked, the pattern selection unit 28 opens a window shown in FIG. 8. In this case, the names of all the fundamental patterns contained in the selected transmission data generation library are sequentially displayed. Desired pattern names are selected from the displayed names.

Three special picture sequences to be shown on the three reels, one picture sequence to be shown on one reel, of the selected type of machine are read in from the transmission data generation library. These special picture sequences are displayed on the "special picture sequence" display unit 32 on the PC screen 12. At first, as the default, the three special pictures located at the centers of the three special picture sequences are selected as the three final stop pictures for the three reels. Here, the final stop pictures are the special pictures to be displayed when the left, middle, and right reels stop. In the actual game machine, the final stop pictures change randomly. Every time the game is played, the final stop pictures that appear on the reels when the reels stop change unpredictably, even if the same pattern (scene) appears. Thus, hits and misses are unpredictable, which is characteristic of a game. However, in testing the liquid crystal display 200, this randomness is undesirable.

However, according to the present game machine display testing apparatus 100, the user can select these final stop pictures. The selected final stop pictures are displayed on a "special picture sequence" display unit 32, surrounded by a stop picture selection frame 33. The default is located at the center of each of the special picture sequences. In order to change the default, the user clicks the stop picture selection frame 33, and moves the stop picture selection frame 33 to a desired picture or clicks the desired picture directly. In this case, a final picture selection unit 34 processes the selected changes.

The selected special pictures are displayed also on the left, middle, and right display regions inside a "stop picture" display unit 36. By clicking stop picture selection keys 37 located above and below the display regions also, the final stop pictures can be changed. Every time one of the stop picture selection keys 37 is clicked, the special picture that appears on the display region moves one by one. When the desired special picture appears, the user stops clicking.

The transmission data for displaying a desired pattern on the liquid crystal display 200 is generated in accordance with these setting conditions. In other words, when a transmission data generation library is newly selected, or when the pattern is changed, or when the stop pictures of one or more of the reels are changed, the transmission data generation unit 13 generates a sequence of frames so that the characters that appear in the selected pattern will move in the prescribed manner and the selected special pictures will become the final stop pictures. For example, the transmission data generation unit 13 generates a transmission data sequence of 300 packets, that is, 300 frames for the duration of ten seconds. The generated transmission data sequence is displayed on a "transmission data" display unit 38 (transmission data display means) on the PC screen 12 (The two-point chain lines shown in FIG. 2 indicate that the data display is omitted.)

The picture number and offset of each of the special pictures are designated by the values of the X located in the third through eighth bytes of the transmission data (the picture number and offset of each of the left, middle, and right pictures are indicated in FIG. 6 and FIG. 7). In addition, if the final stop picture of each of the reels and the total rotation angle of each of the reels (the total rotation angle of the reel from the start of the rotation to the end of the rotation) are prescribed, the special picture that appears at the beginning of the rotation and the offset of the special picture at the beginning of the rotation can be obtained for each of the reels by back calculation.

Using these special pictures and the offsets of these special pictures, the transmission data generator 13 calculates and determines the special picture to be displayed in each frame of the transmission data sequence that represent the selected pattern and the offset value of the special picture. Then the transmission data generator 13 encodes these data into the X of the third through eighth bytes of each of the command packets. In addition, the values to be assigned to the X of the first and second bytes of each of the command packets determine the motions of the characters or the like of the selected pattern. Therefore, these values to be assigned to the X are pre-assigned to each of locations of the frames so that they will change as the frames are advanced.

For example, in the selected pattern, if Kintarou is programmed to raise his right leg for a second, land his right leg, and initiate another motion a second after landing his right leg, then 30 command packets are generated, such that the contents of the first and second bytes of each of the 30 command packets are identical to the contents of the first and second bytes of the command packet shown in FIG. 6A. Subsequently, additional 30 command packets are generated, such that the contents of the first and second bytes of each of the 30 command packets are identical to the contents of the first and second bytes of the command packet shown in FIG. 6B. While the 60 command packets are being generated, the left, middle, and right special pictures rotate or vibrate. In this case, the picture numbers and offset values of the special pictures are encoded into the X of the third through eighth bytes of each of these 60 command packets.

In order to send the transmission data to the test object liquid crystal display 200, a "send" key 41 on the PC screen 12 is clicked. The state of this "send" key 41 is inverted every time this "send" key 41 is clicked. When the "send" key 41 is turned on (when the "send" key 41 is depressed), the transmission data is sent out to the liquid crystal display 200. When the "send" key 41 is turned off (when the "send" key 41 is protruded), the transmission data is not sent out to the liquid crystal display 200. In this way, the transmission data is sent not only to the game machine display equivalent region 22 on the PC screen 12, but also to the liquid crystal display 200. A data transmission control unit 15 carries out this switching operation based on the direction supplied from the data transmission directing unit 42. The "send" key 41, the data transmission directing unit 42, and the data transmission control unit 15 constitute the transmission control means.

The transmission data (command packet) at which the pointer of the software is pointing is transmitted first. The display of the command packet at which the pointer of the software is pointing is inverted on the PC screen 12 (in FIG. 2 is represented by a selection frame 43). The first command packet serves as a default. In order to change the default, one of the six pointer shift keys 44 (transmission data selection means) is used. Two triangular pointer keys 44 are provided below the lower left corner and lower right corner of the "transmission data" display unit 38. One rectangular pointer key 44 is located between these triangular pointer keys 44. Additional two triangular pointer keys 44 are provided to the right of the upper right corner and lower right corner of the "transmission data" display unit 38. Another rectangular pointer key 44 is located between these triangular pointer keys 44. By clicking and shifting the rectangular pointer shift key 44 while continuing to click it, the pointer can be shifted to a desired position. When the top or bottom triangular pointer shift key 44 located to the right of the "transmission data" display unit 38 is clicked, the pointer is shifted one by one upward or downward, respectively. When the left or right triangular pointer shift key 44 located below the "transmission data" display unit 38 is clicked, the pointer is shifted one by one to the left or right, respectively. When the key of the mouse remains pressed, the pointer moves continuously at a constant speed. The data transmission directing unit 42 carries out this operation also.

The transmission data can be sent out in various styles so that the display state of the test object can be tested from various angles. When one of the keys 46a through 46f installed in the "transmission control" region is clicked, the data transmission directing unit 42 executes the corresponding testing operation. The transmission date selection means has the frame 43, the pointer shift key 44 and keys 46a to 46f.

If the →key 46c is clicked, the selected pattern is displayed at a normal speed. The command packet that the pointer 43 is pointing at is sent out first. The remaining command packets are sequentially sent out every 32 milliseconds. In this way, the characters and the like move according to the prescribed sequence at the normal speed, and each of the reels rotates at a prescribed angular speed.

When the "□" key 46b is clicked, the data transmission is temporarily halted, causing the motions of the characters and the like displayed on the screen to be frozen.

In this state of temporary halt, if the "<<" key 46a is clicked, the command packet immediately before the halted command packet is sent out. This causes the scene shown on the screen to regress by one frame and the regressed frame to freeze. If the click button of the mouse is held pressed, the previous command packets are transmitted at a constant speed, causing the scenes shown on the screen to move backward continuously frame by frame.

In this state of temporary halt, if the ">>" key 46d is clicked, the command packet immediately after the halted command packet is sent out. This causes the scene shown on the screen to advance by one frame and the advanced frame to freeze. If the click button of the mouse is held pressed, the subsequent command packets are transmitted at a constant speed, causing the scenes shown on the screen to move forward continuously frame by frame.

If the "→" key 46e is clicked, the transmission data is sent out every 200 milliseconds, showing slow motions.

If the "R" key 46f is clicked, the pointer (43) is reset, and the pointer points at the top of the transmission data. This key is used to repeat the test from the beginning of the selected pattern.

If the "extract BMP" key 47 is clicked, following the direction of the BPM extraction directing unit 48, the BMP file composition unit 23 extracts the bit map data of the frame that had been being displayed on the game machine display equivalent display region 22 at the moment the "extract BMP" key 47 was clicked and saves the extracted bit map data in the BITMAP file holder 24. This extracted bit map data can be displayed on the PC screen 12 or retrieved as a hard copy to be placed at a required position of the application form to be submitted to the qualification agency.

Next, the functions of the "Option (O)" key will be explained. When this key is clicked, items that will be explained below (not shown in the drawing) are displayed.

If the "Change Parallel Port" item is clicked, the parallel port changing unit 49 changes a port for connecting the PC with the liquid crystal interface 11.

If the "Change Emulator Setting" item is clicked, it is determined which of the Z80 emulation and the operation of Win 95 is given a priority (Win 95: a Microsoft operating system).

If the "Change Sprite Setting" item is clicked, the sprite display setting unit 52 changes the "on"-state or "off"-state of each of the eight sprites.

Figure 9:
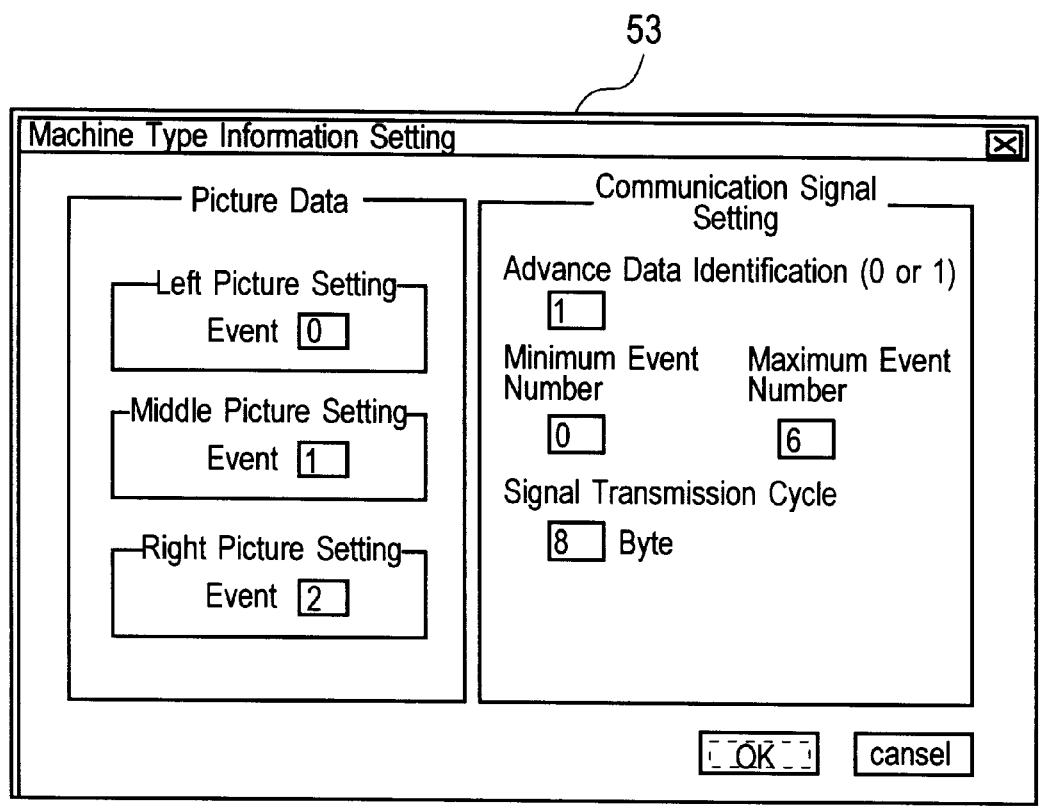
FIG. 9 is a front view of a window 53 for setting a machine type information.

If the "Machine Type Information Setting" item is clicked, a window 53 shown in FIG. 9 appears. Here, the transmission data is set to match the specification of the selected machine.

If the "Enlarge Display" item is clicked, the size of the game machine display equivalent display region 22 can be freely increased or decreased.

If the "Reset (R)" key at the top of the screen 12 is clicked, the image formation CPU emulation unit 16 and the VDP emulation unit 21 are reset.

If the "Help" key is clicked, instructions or diagrams on key operations, how to set each item, how to test a machine specific liquid crystal display, and the like appear on the PC screen 12.

Variations of the present embodiment will now be explained. First, according to the game machine testing apparatus 100 of the present embodiment, the transmission data can be sent to both the liquid crystal display 200 and the game machine display equivalent display region 22 on the PC screen 12. In addition, the bit map data of the image being displayed can be retrieved. According to the present embodiment, any selected scene displayed on the liquid crystal display 200 can be compared with the same selected scene being displayed on the game machine display equivalent display region 22. Thus, when an error occurs on the game machine display equivalent display region 22 of the PC screen 12 or the liquid crystal display 200, the error can be detected with relative ease. In addition, hard copies of various states of display can be obtained. In other words, as a game machine display testing apparatus, the present embodiment functions as a full specification apparatus.

The bit map data extraction function may be removed. Without using this function, any of the programs can be debugged, and the debugged program can be used for the liquid crystal display 200.

The transmission data may be supplied to only one of the game machine display equivalent display region 22 of the PC screen 12 or the liquid crystal display 200. If the transmission data is supplied only to the liquid crystal display 200, the scenes displayed on the liquid crystal display 200 cannot be compared with the same scenes displayed on the game machine display equivalent display region 22. Nonetheless, it is still possible to determine whether the liquid crystal display 200 is correctly displaying the programmed motions or not.

Conversely, the transmission data may be supplied only to the game machine display equivalent display region 22 of the PC screen 12. In this case, the screen display performance of the liquid crystal display 200 is tested only on the game machine display equivalent display region 22 of the PC screen 12. However, in this case also, the programs to be supplied to the liquid crystal display 200 can be visually confirmed. Thus, the game machine display equivalent display region 22 can be used as a visual debugger.

Although the present invention has been explained in reference to the embodiment, it is apparent for those skilled in the art that many changes and modifications can be made without departing from the spirit and scope of the invention, as clear from the following claims.

What is claimed is:

1. A game machine display testing apparatus comprising:
   a library holding means for holding a library which generates commands to be supplied from a game machine main control apparatus to a game machine display;
   a transmission data generating means for generating transmission data to be transmitted to the game machine display using the library;
   a transmission data display means for displaying on a table the generated transmission data;
   a transmission data selecting means for selecting required data from the displayed transmission data; and
   a transmission controlling means for controlling transmission of the selected transmission data to the game machine display.

2. A game machine display testing apparatus as claimed in claim 1, wherein:
   the library holding means is a transmission data generation library holding unit for holding a set of data sequences which become a basis for patterns to be displayed on a screen of the game machine display;
   the transmission data generating means is a transmission data generating unit for generating a set of transmission data sequences in a form identical to that of commands to be supplied from the game machine main control apparatus;
   the transmission data display means is a transmission data display unit that is displayed on a personal computer screen;
   the transmission data selecting means has a frame for designating one of a plurality of transmission data to be displayed on the transmission data display means, a pointer shift key for shifting a position of the frame, and a key for designating a transmission speed of the designated transmission data and frames to be transmitted; and
   the transmission controlling means has a send-key for discontinuing supply of transmission data to the game machine display, a data transmission directing unit which switches a supply destination of transmission data when the send-key is operated, and a data transmission control unit which controls transmission of the transmission data in accordance with a direction supplied from the data transmission directing unit.

3. A game machine display testing apparatus as claimed in claim 1, further comprising:

a program holding means for holding an image composition means program for composing images to be displayed on the game machine display;

an image data holding means for holding image data to be used to compose the images;

an image composition emulating means for emulating the image composition means, executing the program being held in the program holding means, extracting required data from the image data being held in the image data holding means, and composing images that correspond to the selected transmission data; and a display controlling means for emulating the game machine display, and displaying the composed images on a screen of the game machine display testing apparatus.

4. A game machine display testing apparatus as claimed in claim 3, wherein:

the program holding means is a program ROM equivalent file holding unit for holding a machine language, a content of the machine language being identical to that of a program ROM of the game machine display;

the image data holding means is an image ROM equivalent file holding unit for holding image data, a content of the image data being identical to that of an image ROM of the game machine display;

the image composition emulating means is an image formation CPU emulation unit for emulating functions of an image formation CPU of the game machine display; and the display controlling means has:

a VDP emulation unit for emulating functions of a VDP of the game machine display; and a screen picture plotting preparation unit for selecting data on sprites to be turned on from data supplied from the VDP emulation unit, and displaying only the selected data onto the screen of the game machine display testing apparatus.

5. A game machine display testing apparatus as claimed in claim 3, further comprising an image data extracting means for extracting a data of an image displayed on the screen of the game machine display testing apparatus.

6. A game machine display testing apparatus as claimed in claim 5, wherein the image data extracting means is a BMP file composition unit for extracting as a file a bit map data of the image being displayed on the screen of the game machine display testing apparatus.

7. A game machine display testing apparatus comprising:

a library holding means for holding a library which generates commands to be supplied from a game machine main control apparatus to a game machine display;

a transmission data generating means for generating transmission data to be transmitted to the game machine display using the library;

a transmission data display means for displaying on a table the generated transmission data;

a transmission data selecting means for selecting required data from the displayed transmission data;

a program holding means for holding an image composition means program which composes images to be displayed on the game machine display;

an image data holding means for holding image data to be used to compose the images;

an image composition emulating means for emulating the image composition means, executing the program being held in the program holding means, extracting required data from the image data being held in the image data holding means, and composing images that correspond to the selected transmission data; and a display controlling means for emulating the game machine display, and displaying the composed images on a screen of the game machine display testing apparatus.

8. A game machine display testing apparatus as claimed in claim 7, wherein:

the library holding means is a transmission data generation library holding unit for holding a set of data sequences which become a basis for patterns to be displayed on the screen of the game machine display;

the transmission data generating means is a transmission data generating unit for generating a set of transmission data sequences which are identical in form as commands to be supplied from the game machine control apparatus;

the transmission data display means is a transmission data display unit that is displayed on a personal computer screen;

the transmission data selecting means has a frame for designating one of a plurality of transmission data which are displayed on the transmission data display means, a pointer shift key for shifting a position of the frame, and a key for designating a transmission speed of the designated transmission data and frames to be transmitted;

the program holding means is a program ROM equivalent file holding unit for holding a machine language, a content of the machine language being identical to that of a program ROM of the game machine display;

the image data holding means is an image ROM equivalent file holding unit for holding image data, a content of the image data being identical to that of an image ROM of the game machine display;

the image composition emulating means is an image formation CPU emulation unit for emulating functions of an image formation CPU of the game machine display; and the display control means has a VDP emulation unit for emulating functions of a VDP of the game machine display, and a screen picture plotting preparation unit for selecting data on sprites to be turned on from data supplied from the VDP emulation unit, and displaying only the selected data onto the screen of the game machine display testing apparatus.

9. A game machine display testing apparatus as claimed in claim 7, further comprising an image data extracting means for extracting the data of the image being displayed on the screen of the game machine display testing apparatus.

10. A game machine display testing apparatus as claimed in claim 9, wherein the image data extracting means is a BMP file composition unit for extracting as a file a bit map data of the image being displayed on the screen of the game machine display testing apparatus.

* * * * *